April 12, 1949.  L. G. WEYMOUTH  2,466,962
ARTICLE CONVEYING AND DISTRIBUTING MECHANISM
Filed July 12, 1945.  2 Sheets-Sheet 1
Fig. 1.
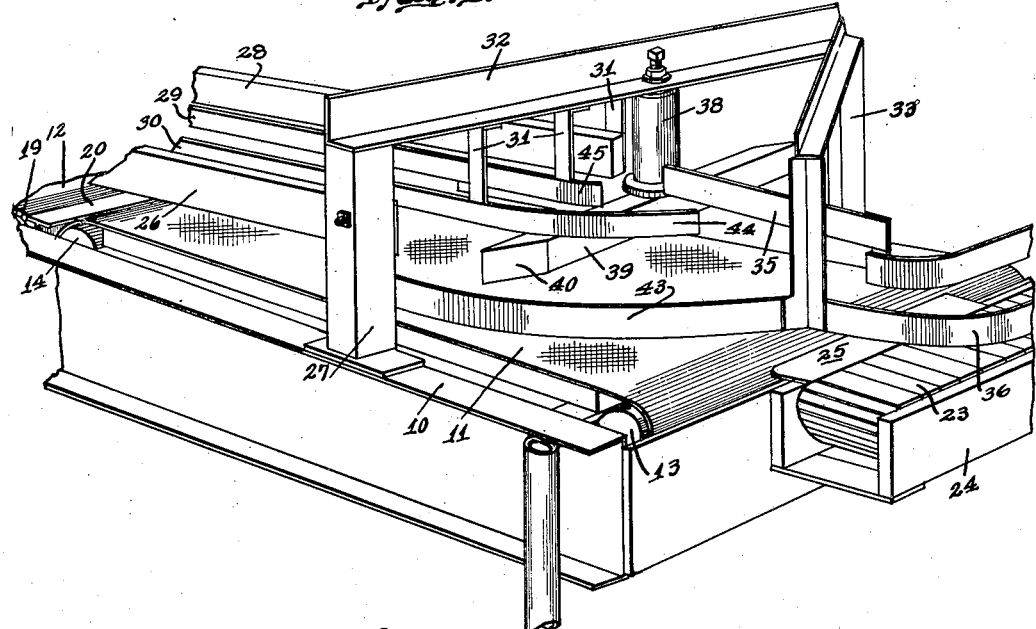
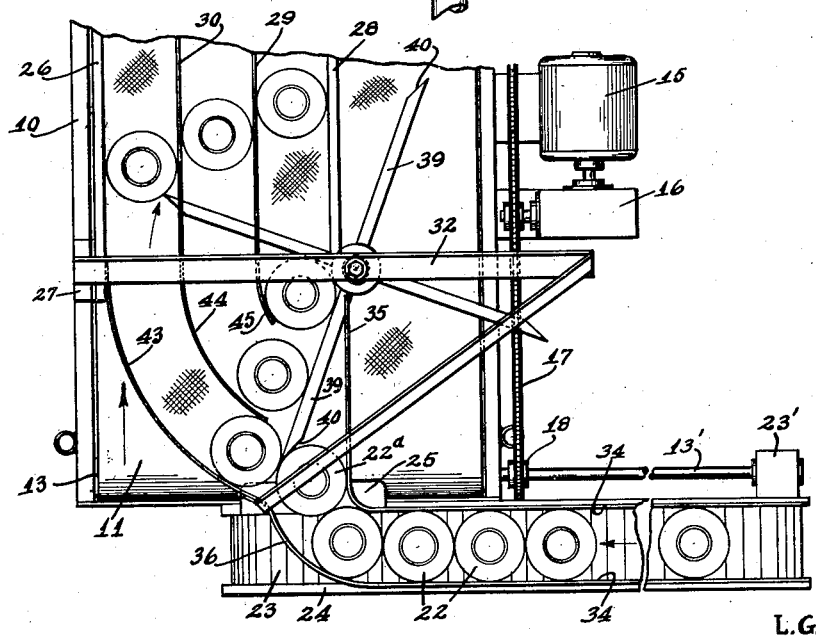
Fig. 2.
Inventor
L. G. WEYMOUTH
By Rule and Hoge,
Attorneys

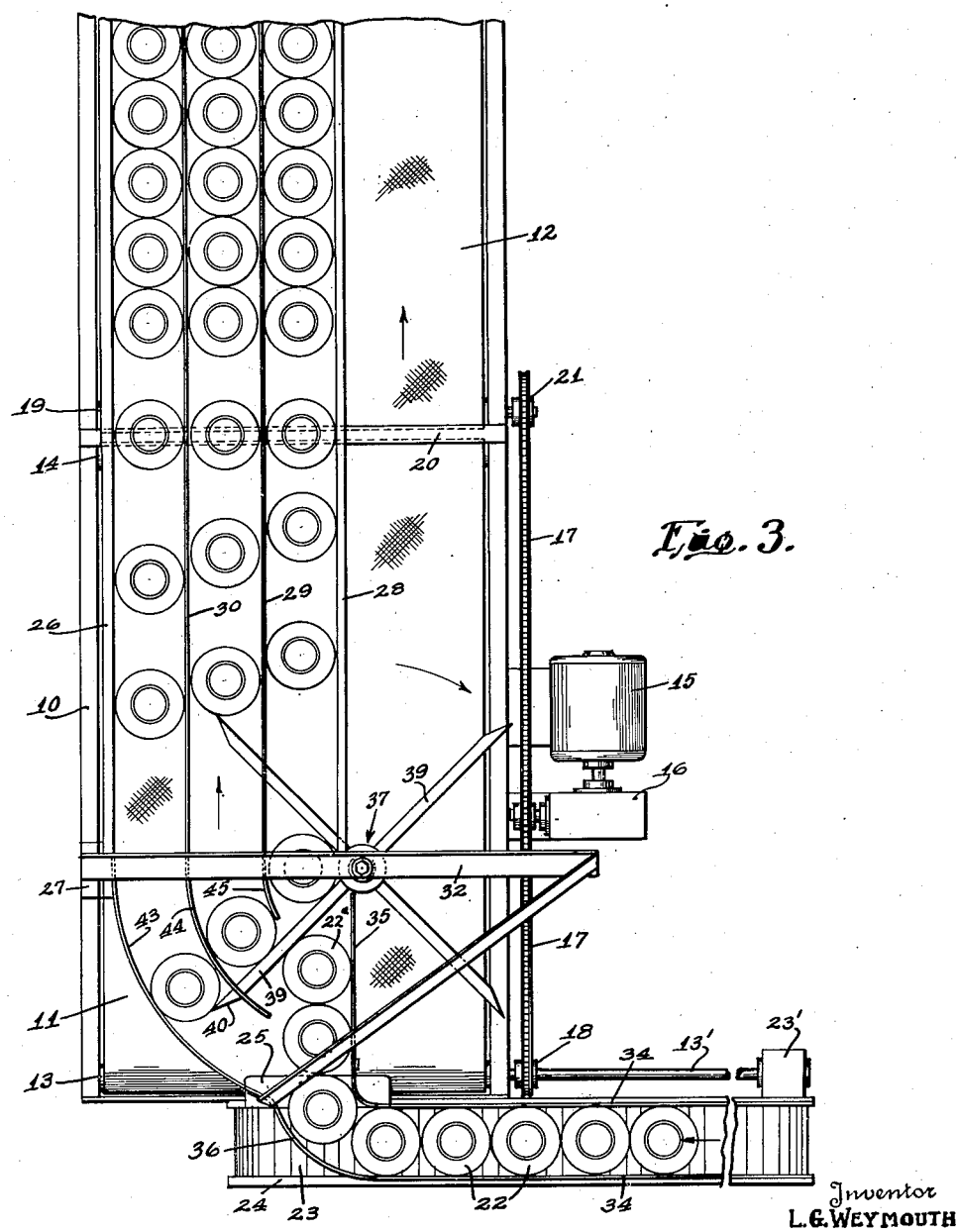

Patented Apr. 12, 1949

2,466,962

UNITED STATES PATENT OFFICE 2,466,962

ARTICLE CONVEYING AND DISTRIBUTING MECHANISM

Leslie G. Weymouth, Mountain View, Calif., assignor to Owens-Illinois Glass Company, a corporation of Ohio Application July 12, 1945, Serial No. 604,568

9 Claims. (Cl. 198—31)

My invention relates to the apparatus for transferring articles from one position to another and for rearranging or distributing the articles while in transit.

An object of the invention is to provide an apparatus by which articles may be advanced in a row to a distributing station and there automatically distributed to a plurality of lanes along which they are advanced in separate rows.

A further object of the invention is to provide an apparatus adapted for conveying articles, such as bottles, jars or the like, and distributing and rearranging them in a plurality of parallel rows.

Other objects of the invention will appear hereinafter.

Referring to the accompanying drawings which illustrate an apparatus embodying my invention:

Fig. 1 is a perspective view of the apparatus, parts being broken away.

Fig. 2 is a plan view of the same.

Fig. 3 is a view similar to Fig. 2, but with the distributing wheel rotated to a different position.

The apparatus comprises a framework 10, in which are mounted endless horizontally disposed belt conveyors 11 and 12. The conveyor 11 runs on rolls 13 and 14 journalled in the frame 10 and is driven by an electric motor 15. The motor operates through speed reduction gearing contained in a gear box 16, to drive a sprocket chain 17 trained over a drive sprocket wheel 18 on the shaft 13¹ of the roll 13.

The belt conveyor 12 runs over a roll 19 parallel with roll 14, the upper surfaces of the belts 11 and 12 being in the same horizontal plane. A stationary bar 20 bridges the narrow space between the belts. The belt 12 may be driven either by the motor 15, or a separate motor and at the same speed or a slower speed than the conveyor 11. As shown, the conveyor 12 is driven by the motor 15 geared thereto through the sprocket chain 17 which is trained over a sprocket wheel 21 on the shaft of the roll 19.

The articles 22, herein shown and referred to as jars, are transmitted to the conveyor 11 by an endless conveyor 23, herein shown as a flat-top chain conveyor mounted in a conveyor frame 24 attached to the frame 10. The chain conveyor 23 is arranged with its upper surface in the same horizontal plane as that of the conveyor 11 and may extend and travel in any desired direction leading to the conveyor 11. As shown, the conveyors 23 and 11 extend in directions at right angles. The conveyor 23 is driven by the motor 15 operating through the shaft 13¹ and gearing within a gear case 23¹. A stationary transfer plate 25 bridges the space between the conveyors 23 and 11, being positioned to support the articles 22 as they move from one conveyor to the other.

Parallel lanes extending lengthwise of the conveyors 11 and 12 are formed by a series of parallel guide rails positioned over and spaced above the conveyors. In the construction shown there are three lanes, but a greater or less number might be provided. The guide rails include an outer rail 26 attached at its forward end to a post 27, an inner rail 28 (Fig. 1) and intermediate rails 29 and 30. The rails 28, 29 and 30 are supported by hangers 31 depending from an angle bar 32 mounted on the post 27 and a post 33.

The jars 22 on the conveyor 23 are held in place between stationary guide rails 34. The inner guide rail 34 is provided at its forward end with an extension 35 or rail extending over the conveyor 11 in a direction at right angles to the conveyor 23. The outer guide rail 34 is formed at its forward end with a curved section 36 by which the jars 22 are deflected onto the plate 25, off which they are pushed onto the conveyor 11.

Means for distributing and directing the jars to the parallel lanes, includes a distributing transfer device in the form of a star wheel 37 located at the distributing station. The wheel is mounted over the conveyor 11 for free rotation about a vertical axis and includes a hub 38 journalled at its upper end in the angle bar 32. Arms 39 radiate from the hub and as they rotate, pass beneath the rails 28, 29 and 30, the rails thus being in overlapping relation to the path of the said arms. The outer end portion of each arm 39 is bevelled at 40 whereby the arm is pointed.

The operation by which the jars are distributed is as follows:

Assuming the parts to be in the positions shown in Fig. 2, a jar 22a is directly behind and in contact with an arm 39 of the star wheel so that as the jar is pushed inwardly onto the belt 11, rotates the star wheel in a clockwise direction. The group of three jars on the front side of the arm 39 is pushed forward thereby, being guided into the respective lanes by the curved guide rails 43, 44 and 45 which are extensions of the parallel rails. Fig. 3 shows the star wheel in a more advanced position. The row of incoming jars, headed by the jar 22a, rotates the star wheel at an accelerating speed until the arm 39 in contact with the jar 22a is brought to a position about parallel with the cross bar 32. This brings the next succeeding arm 39 into position to engage the group of jars which has just been moved onto the conveyor 11.

As shown in Fig. 3, the incoming jars headed by the jar 22a move forward in a row along the stationary rail 35, which extends in the direction of travel of the conveyor 11 and provides a backing for the jars, so that the latter can exert a pressure on the arm 39 without being moved out of line by the back pressure of said arm. The row of jars is thus maintained in a straight line with the jars moving straight forward with the belt until the next succeeding arm 39 passes the stationary guide 35 and positions the row of jars laterally away from the rail 35, as shown in Fig. 2, directing them into the several lanes. Owing to the overlapping relation of the guide rails 43, 44, 45, with respect to the path of the radial arms 39, the jars are distributed and guided into the several lanes before they are carried out of contact with the radial arms.

After the jars have passed beyond the control of the star wheel, they are carried forward by the conveyor and positioned on the stationary plate 20 from which they are pushed by the next group of jars onto the conveyor 12.

Modification may be resorted to within the spirit and scope of my invention.

I claim:

1. Article conveying and distributing apparatus comprising means for moving and guiding a line of articles along a predetermined path to a distributing station, guide rails defining a plurality of lanes extending from said station, and a distributor comprising a horizontal arm mounted for rotation about a vertical axis at said station, means for rotating said arm continuously in one direction about said axis and causing it during each rotation to move across said path and in overlapping relation to the guide rails, with the said arm extending transversely to the said lanes as it overlaps the guide rails and arranged to distribute articles selectively to the several lanes during each said rotation, and stationary guiding means forming a backing for the articles during their transfer from the first said conveyor into said lanes.

2. The combination of a horizontal conveyor extending to a distributing station and by which articles are conveyed in a line to said station, a second horizontal conveyor extending from said station, means providing a plurality of lanes extending along said second conveyor, a distributing wheel mounted at said station for rotation about a vertical axis and comprising radial arms, means for guiding articles from said first mentioned conveyor into the path of said arms, guiding means having a stationary mounting in overlapping relation to the path of said arms and cooperating therewith for distributing the articles and guiding them selectively into said lanes, and guiding means positioned to provide a backing for the articles during their transfer from the first mentioned conveyor into said lanes.

3. The combination of a horizontally disposed endless belt conveyor, a second horizontally disposed conveyor having a discharge end adjacent to the receiving end of said belt conveyor, a star wheel mounted over said belt conveyor at said receiving end for rotation about a vertical axis and comprising radial arms positioned over the belt conveyor, means for guiding articles as they are discharged from said second conveyor, into the path of said arms, and stationary guide rails in overlapping relation to the path of said arms and cooperating therewith to selectively guide the articles into predetermined positions transversely of the belt conveyor.

4. The combination of a horizontally disposed endless belt conveyor, a plurality of guide rails positioned over the conveyor and extending lengthwise thereof, said rails defining a plurality of lanes, a second horizontally disposed endless conveyor, guide rails thereover positioned to guide articles in a single line as they are carried forward on the conveyor, said second conveyor extending to a position adjacent to the first mentioned conveyor, a star wheel mounted for rotation about a vertical axis and comprising radial arms extending over said belt conveyor, and guiding means in position to guide articles while carried on said belt conveyor toward the axis of the star wheel and within the path of said arms, said first mentioned guide rails being extended into position to receive the articles as they are moved by said arms.

5. The combination of a horizontally disposed endless belt conveyor, means for driving the conveyor horizontally, a star wheel mounted for rotation about a vertical axis and positioned over the conveyor, said star wheel comprising radial arms rotating horizontally over the conveyor, means for placing articles on the conveyor and causing them to be carried forward in the direction of travel of the the conveyor while in the path of said arms and thereby causing certain of said articles to engage the rear faces of said arms and rotate the star wheel, thereby causing the front faces of succeeding arms to engage the said articles and move them transversely of the conveyor, and stationary guides positioned over the conveyor and in overlapping relation to the path of said arms in position to guide the said articles and distribute them laterally of the conveyor while the articles are within the range of travel of said arms.

6. Article conveying and distributing apparatus comprising a star wheel mounted to rotate freely about a stationary vertical axis, said wheel comprising arms extending radially from said axis, means for conveying articles and directing them single file into the path of said arms, thereby causing the foremost article to engage behind a said arm and rotate the star wheel while succeeding articles are moved into position to form with said foremost article a row in the path of said arms, whereby said rotation of the star wheel brings a succeeding arm behind the row of articles, each arm being operable as it advances to advance a row of said articles while succeeding articles are forming a row, and stationary guiding means for guiding and distributing the articles in predetermined lanes while the articles are in the path of the star wheel.

7. Article conveying and distributing apparatus comprising in combination, a star wheel mounted to rotate freely about a stationary vertical axis, and comprising radial arms each presenting a front driving surface and a rear surface, said surfaces being substantially radial to the said axis, driving means for advancing a row of articles, means for guiding the advancing articles single file into the path of said arms and causing the foremost article to engage the rear surface of one said arm and thereby rotate the star wheel while succeeding articles are brought by said driving and guiding means into the path of said arms, thereby bringing a row of the articles into position to be engaged by the driving surface of the next succeeding arm of the star wheel and to be carried forward thereby, and stationary guide rails positioned to overlap the path of said arms and arranged to guide the articles of said row into predetermined lanes while the articles are within the range of and being advanced by the star wheel.

8. Article conveying and distributing apparatus comprising in combination, a star wheel mounted to rotate freely about a stationary vertical axis, and comprising radial arms each presenting a front driving surface and a rear surface, said surfaces being substantially radial to the said axis, driving means for advancing a row of articles, means for guiding the advancing articles single file into the path of said arms and causing the foremost article to engage the rear surface of one said arm and thereby rotate the star wheel while succeeding articles are brought by said driving and guiding means into the path of said arms, said guiding means including a guide rail extending horizontally substantially radial to the star wheel in overlapping relation to the path of the said arms and forming a backing for the said articles while the latter are in driving engagement with an arm of the star wheel.

9. The combination of a horizontally disposed endless belt conveyor, means for driving the conveyor horizontally, a star wheel mounted over the conveyor for free rotation about a vertical axis and comprising radial arms, a second travelling conveyor, means for driving the second conveyor, guiding means extending along the second conveyor and positioned to guide articles thereon and direct them single file onto said belt conveyor in the path of said arms and thereby cause the articles to engage behind said arms and rotate the star wheel, a stationary guide rail extending horizontally over the belt conveyor toward the axis of the star wheel, in position to form a guide for the articles as they are moved onto the belt conveyor and forming a backing for a said article as the latter engages behind a said arm and rotates the star wheel, and stationary curved guides positioned over the belt conveyor in overlapping relation to the path of said radial arms in position to receive the articles as they are advanced by said arms and guide them into predetermined lanes extending lengthwise of the belt conveyor.

LESLIE G. WEYMOUTH.

REFERENCES CITED

The following references are of record in the file of this patent:

UNITED STATES PATENTS

| Number | Name | Date |
|---|---|---|
| 1,300,010 | Porter | Apr. 8, 1919 |
| 1,871,676 | Ermold | Aug. 16, 1932 |
| 1,894,547 | Tucker | Jan. 17, 1933 |
| 1,998,163 | Meyer | Apr. 16, 1935 |
| 2,090,129 | Kimball et al. | Aug. 17, 1937 |
| 2,363,681 | McNamara et al. | Nov. 28, 1944 |